US 6,636,053 B1

(12) United States Patent
Gozzini

(10) Patent No.: US 6,636,053 B1
(45) Date of Patent: Oct. 21, 2003

(54) CAPACITIVE PIXEL FOR FINGERPRINT SENSOR

(75) Inventor: Giovanni Gozzini, Berkeley, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 86 days.

(21) Appl. No.: 10/052,869

(22) Filed: Nov. 2, 2001

(51) Int. Cl.[7] ................................. G01R 27/26
(52) U.S. Cl. ........................... 324/658; 324/678
(58) Field of Search ..................... 324/658, 661, 324/662, 663, 671, 690, 678; 382/124, 127

(56) References Cited

U.S. PATENT DOCUMENTS

| 4,353,056 | A | | 10/1982 | Tsikos | |
|---|---|---|---|---|---|
| 6,114,862 | A | | 9/2000 | Tartagni et al. | |
| 6,317,508 | B1 | | 11/2001 | Kramer et al. | |
| 6,483,931 | B2 | * | 11/2002 | Kalnitsky et al. | ........... 382/124 |
| 6,512,381 | B2 | * | 1/2003 | Kramer | ...................... 324/658 |
| 6,515,488 | B1 | * | 2/2003 | Thomas | ...................... 324/662 |
| 6,525,547 | B2 | * | 2/2003 | Hayes | ........................ 324/662 |
| 6,538,456 | B1 | * | 3/2003 | Dickinson et al. | .......... 324/658 |
| 2003/0016849 | A1 | * | 1/2003 | Andrade | ..................... 382/124 |

* cited by examiner

*Primary Examiner*—N. Le
*Assistant Examiner*—Walter Benson
(74) *Attorney, Agent, or Firm*—Lisa K. Jorgenson; Peter J. Thomas

(57) ABSTRACT

An electrically floating capacitor plate defines a sensing capacitor with a fingerprint sensing surface thereabove. A reference voltage pulse is selectively applied to a pixel input node that is capacitively coupled to the floating plate, which in turn is capacitively coupled to the input node of a charge integrator. During a sensing operation, the charge integrator generates a pixel output signal that is a function of the variable capacitance of the sensing capacitor, which corresponds to a ridge or valley fingerprint characteristic that appears directly above the floating plate.

21 Claims, 3 Drawing Sheets

CAPACITIVE PIXEL FOR FINGERPRINT SENSOR

BACKGROUND OF THE INVENTION

The present invention relates generally to semiconductor fingerprint detectors, and more particularly to improvements in capacitive elements used to sense the fingerprint pattern of a finger pressed against a sensing surface.

A capacitive distance sensor is disclosed in commonly-assigned U.S. Pat. No. 6,114,862 by Tartagni et al., the disclosure of which is hereby incorporated by reference. The Tartagni et al. patent discloses a fringing capacitive sensing technique in which two side-by-side capacitor plates are disposed just beneath a sensing surface at each of many cell locations in a two-dimensional array of sensor cells or "pixel" cells. The side-by-side capacitor plates of each pixel cell form part of a feedback circuit having an effective feedback capacitance that is modulated by the presence of live skin close to the sensing surface.

The technique disclosed in the Tartagni et al. patent is an active sensing technique in which transistor circuitry is employed at each pixel location to assist in the detection and output signal generation of the signal from each pixel cell. Passive capacitive sensor cells are also known in the art, as disclosed by example in U.S. Pat. No. 4,353,056.

SUMMARY OF THE INVENTION

The present invention provides an improved capacitive pixel for a fingerprint sensing device. Active sensing is used in a solid-state pixel structure that directly senses the electric field potential of a fingerprint of a user's finger pressed against a sensing surface. A floating capacitor plate is disposed beneath the sensing surface to define a sensing capacitor with the skin of the user's finger. The capacitance of the sensing capacitor varies with the proximity of the skin to the sensing surface so that fingerprint ridges produce a higher capacitance than fingerprint valleys. First and second coupling capacitor plates are disposed beneath the floating capacitor plate to define first and second coupling capacitors. The coupling capacitors are connected in series between a reference voltage source and an input to a charge integrator. When a reference voltage signal is applied to the pixel, the charge integrator generates an output signal that is a function of the capacitance of the sensing capacitor.

Accordingly, a compact pixel structure can be provided in an array of pixels to enable capturing of a high resolution fingerprint image. The structure gives a high signal-to-noise level response and is relatively insensitive to parasitic capacitive effects.

BRIEF DESCRIPTION OF THE DRAWINGS

For a more complete understanding of the present invention and the advantages thereof, reference is now made to the following description taken in conjunction with the accompanying Drawings, in which.

DETAILED DESCRIPTION OF THE INVENTION

Figure 1:
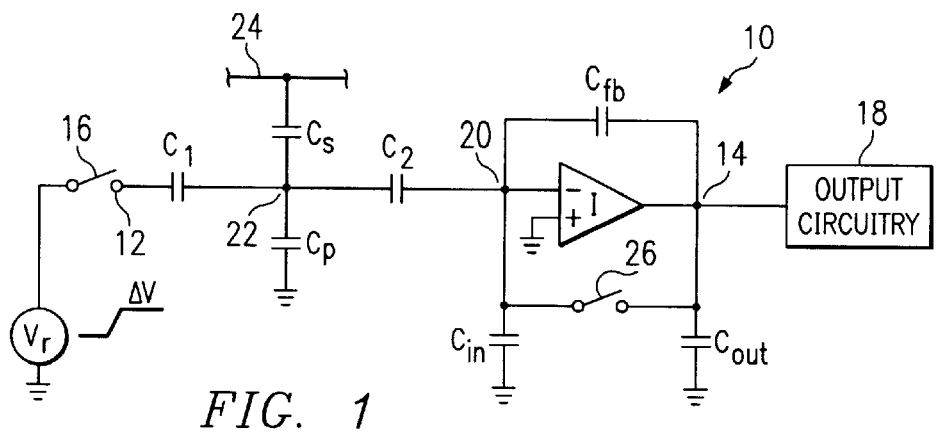
FIG. 1 is a schematic circuit diagram illustrating the invention.

Referring to FIG. 1, a preferred embodiment of a direct field active capacitive pixel is shown and designated generally by reference numeral 10. Pixel 10 has an input node 12 and output node 14. A switch 16, such as an NMOS transistor, is provided to selectively connect the input node 12 to a reference voltage source $V_r$. The output node 14 is connected to output circuitry 18 that senses output signals from the pixel 10 periodically. Each pixel 10 is typically one of many identical such pixels arranged in a two-dimensional array formed on a semiconductor chip that is the essential component of a solid-state fingerprint sensing device. Each pixel 10 includes a variable capacitor $C_s$ that senses a portion of a human fingerprint according to a direct capacitive sensing technique described below.

The output of pixel 10 is generated by a charge integrator I, which is similar to the inverting amplifier of U.S. Pat. No. 6,114,862 with a different feedback arrangement, as described below. The charge integrator I integrates the charge appearing at its negative (−) input and generates a corresponding amplified analog output. Series connected capacitors $C_1$ and $C_2$ interconnect the pixel's input node 12 with a node 20 that corresponds to the charge integrator's negative (−) input. The charge integrator's positive (+) input is connected to a voltage source such as ground. The connection between capacitors $C_1$ and $C_2$ defines an electrically floating node 22 that also defines a point of connection between capacitors $C_s$ and $C_p$. Capacitor $C_p$ represents the parasitic capacitance that exists between the floating node 22 and ground node. The ground symbols in FIG. 1 may represent the actual ground terminal of the fingerprint sensing device or may represent a virtual ground bus internal to the chip.

Capacitor $C_s$ is the pixel's sensing capacitor that has one plate disposed just beneath a fingerprint sensing surface 24. The other plate of capacitor $C_s$ is in effect the sensing surface itself together with the skin of the user's finger contacting the sensing surface (or disposed just above the sensing surface) during a sensing operation. It will be appreciated that fingerprint ridges will contact the sensing surface, and fingerprint valleys will be disposed just above the sensing surface, during a sensing operation. Just prior to a sensing operation, a reset switch 26 is opened to prepare the charge integrator I to generate an accurate output signal during the sensing operation. The reset switch 26 may be a conventional transistor, such as an NMOS transistor, and interconnects the charge integrator's input node 20 and output node 14.

A feedback capacitor $C_{fb}$ is included in the circuit and couples the charge integrator's output node 14 to its input node 20. The device designer can select the capacitance value of feedback capacitor $C_{fb}$ to tune the gain of the charge integrator I to a predetermined desired level. Additionally, capacitor $C_{in}$ is connected between the charge integrator's input node 20 and ground, and capacitor $C_{out}$ is connected between the charge integrator's output node 14 and ground.

These two additional capacitors represent parasitic capacitances, but their presence in the circuit does not affect the gain of the charge integrator I, as will be explained below.

The pixel 10 of FIG. 1 can be considered as having two stages: a capacitive sensing stage comprising capacitors $C_s$, $C_1$, $C_2$, and $C_p$; and an active charge integrator stage comprising the charge integrator I, feedback capacitor $C_{fb}$, reset transistor switch 26, and the parasitic capacitors $C_{in}$ and $C_{out}$. Each pixel 10 of the array also has a dedicated select transistor, which is depicted in FIG. 1 as switch 16. The reference voltage source $V_r$ and the output circuitry 18 are shared by the various pixels of the fingerprint sensor array. Although described herein in the context of a two-dimensional sensor array, there may be one-dimensional applications of the invention in which only a single row of pixels is employed.

In operation, the pixel 10 is periodically interrogated or "read" in a sequence that individually interrogates each pixel in the entire array of similar such pixels. The array can be addressed in a way similar to the way a random access memory chip is addressed, using row and column decoders. Address decoder circuitry (not shown) can select individual pixels for interrogation one at a time in a predetermined sequence. The pixel 10 takes its turn in the addressing sequence when switch 16 closes (i.e., when transistor 16 is turned on). Just after select transistor 16 turns on, an input pulse signal $\Delta V$ is generated by reference voltage source $V_r$. The pulse $\Delta V$ propagates through the series-connected capacitors $C_1$ and $C_2$ to node 20, where it appears as a transient increase in charge that is input to the charge integrator I. The charge integrator's output signal at node 14 is defined as the pixel's output $V_{pixout}$, whose analog value is the product of the reference voltage input pulse $\Delta V$ and the gain $G_{pix}$ of the charge integrator I:

$$V_{pixout} = \Delta V \cdot G_{pix}$$

When the output of pixel 10 at node 14 is detected by the output circuitry 18 during the array interrogation sequence, the output circuitry 18 creates a digitized value of the analog output $V_{pixout}$. It will be appreciated that the output circuitry 18 will include an analog-to-digital converter (not shown) for converting the analog pixel outputs to digital signals for output off the chip for processing by a system processor or computer.

Each individual pixel of the sensing array occupies an area of about 50 microns by 50 microns. In a typical fingerprint sensor, the entire sensing surface of which surface 24 is a part is rectangular and has dimensions of 12.8 mm by 18.0 mm. Thus, there may be over 90,000 pixels in a typical fingerprint sensor, which enables a very high resolution of the digitized fingerprint image to be achieved. Since an individual pixel can be addressed and its output read in less than a microsecond, an entire fingerprint image can be captured in less than one-tenth of a second. Each of the digitized values of the pixel outputs can be stored in a memory or compared to previously stored fingerprint data in memory. A gray scale image of a detected or previously stored fingerprint can be output to a display screen if desired for visual inspection.

In the circuit of FIG. 1, the gain $G_{pix}$ of the charge integrator I bears the following relationship to the pixel's capacitors:

$$G_{pix} = -C_1 \cdot C_2 / C_{fb}(C_s + C_1 + C_2 + C_p)$$

It will be appreciated that $C_s$ is a variable capacitor and that $C_1$, $C_2$, $C_{fb}$ and $C_p$ are fixed-value capacitors. Within the device design limits, the values of $C_1$, $C_2$, $C_{fb}$ and $C_p$ can be chosen by the designer to optimize the response of each pixel of the fingerprint sensor. The parasitic capacitor $C_p$ can be made relatively small by making the dielectric thickness between the floating node 22 and ground sufficiently large. Capacitor $C_s$ varies from a maximum value (when a ridge of a fingerprint is pressed against the sensor surface 24 immediately above the particular pixel location) to a minimum value (when a valley of a fingerprint is near the sensor surface 24 immediately above the particular pixel location). Preferably, the capacitance values of $C_1$ and $C_2$ are designed to be equal to each other and essentially the same as the maximum value of $C_s$.

From the foregoing it will be appreciated that the change in values of $V_{pixout}$ from the value when sensing a fingerprint ridge to the value when sensing a fingerprint valley is substantial relative to the amplitude of the input pulse $\Delta V$ generated by the reference voltage source $V_r$. Additionally, as the formula for $G_{pix}$ written above reveals, the parasitic capacitances $C_{in}$ and $C_{out}$ do not effect the $V_{pixout}$ signal value. Although the parasitic capacitor $C_p$ does effect the pixel's gain $G_{pix}$, techniques discussed below can be used to minimize this parasitic effect.

Figure 2:
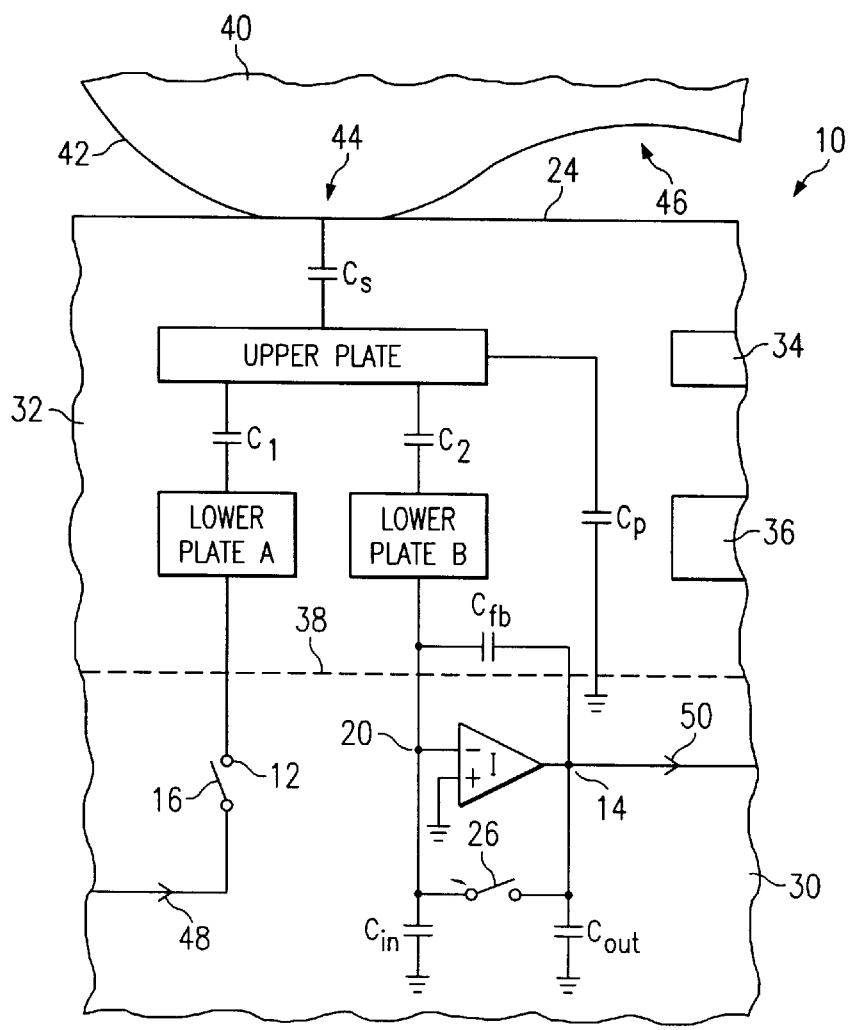
FIG. 2 is a schematic vertical cross-section of a portion of a semiconductor device embodying the invention with circuit elements superimposed on the structure showing their interconnections and relationships to capacitor plates embedded in the structure.

Referring now to FIG. 2, a description of the capacitive sensing stage layout in its basic form will be described, like reference characters previously used designating corresponding elements. It will be appreciated that the pixel 10 is a small part of a larger fingerprint sensor that is fabricated as a specialized semiconductor integrated circuit chip. The starting material is a semiconductor substrate, which conventionally is a monocrystalline silicon wafer large enough to include many identical fingerprint sensors that are eventually separated by slicing the wafer into chips. The individual chip substrate portion is designated by reference numeral 30 in FIG. 2. Disposed atop the substrate 30 is a composite dielectric body 32, which defines the sensing surface 24 in the finished device.

The composite dielectric body 32 includes multiple layers of dielectric or insulating material that are not shown separately. These dielectric layers include conventional oxide and nitride layers known to those skilled in the art of semiconductor device fabrication. Within the composite dielectric body 32 are several levels of conductive layers that are deposited and patterned into separate conductors. Three such conductors are shown in FIG. 2 as part of pixel 10 and are labeled: Upper Plate, Lower Plate A and Lower Plate B. The Upper Plate is patterned from an uppermost conductive layer embedded within the dielectric body 32, and preferably consists essentially of aluminum. CVD deposition of aluminum can be used to form the uppermost conductive layer according to known techniques. Known photolithographic patterning techniques may be also be employed. Lower Plate A and Lower Plate B, which are arranged side-by-side with a narrow gap (e.g., 2 to 3 microns) therebetween, are patterned from a conductive layer lying beneath the uppermost conductive layer. Lower Plate A and Lower Plate B may also be formed from deposited aluminum or may comprise conductive polysilicon such as a conventional silicided polysilicon. Similarly-formed plates 34 and 36 of an adjacent pixel are partially shown at the broken-off right edge of the composite dielectric layer 32.

A dashed line 38 schematically indicates a transition from the composite dielectric body 32 to the substrate 30 below. However, it will be appreciated that the structure is much more complex than depicted. The substrate 30 will be understood to include an upper epitaxial layer in which transistor regions are formed in active areas defined by oxide isolation walls. This is widely known. The transistors are typically MOSFETs including both PMOS and NMOS transistors and can include bipolar transistors, all of which can be fabricated using conventional biCMOS technology.

It will also be understood that FIG. 2 only specifically shows the capacitor plates within composite dielectric body 32 that define capacitors $C_s$, $C_1$ and $C_2$ in their juxtaposed relationship to each other and the fingerprint sensing surface 24. The circuit elements designated $C_s$, $C_1$ and $C_2$ in FIG. 2 merely show how the surface 24, Upper Plate, Lower Plate A and Lower Plate B interact electrically according to the circuit diagram of FIG. 1; they are not separate structural elements. Likewise, capacitor $C_p$ in FIG. 2 is parasitic and not a separate structural element. However, capacitor $C_{fp}$ is a separate structural element designed to have a particular capacitance value within manufacturing tolerances. Capacitor $C_{fp}$ may be formed in any suitable manner, and may comprise, for example, metal plates at two different levels, or a metal plate disposed over a conductive polysilicon layer, or a conductive polysilicon layer disposed over a heavily-doped surface region in the substrate 30. In whatever form, the capacitor plates of capacitor $C_{fp}$ should have precisely defined dimensions and be separated by a dielectric layer of a precisely controlled thickness so that the capacitance value of $C_{fp}$ is a predetermined value maintained within a tight tolerance. As previously noted, capacitor $C_{fp}$ plays an important role in establishing the gain $G_{pix}$ of the charge integrator I.

It will be appreciated that the durability of the sensing surface 24 is an important design consideration. A suitable material for providing such a durable sensing surface is silicon carbide. In practice, the dielectric material between the Upper Plate and the sensing surface 24 may be made of several very thin layers stacked atop each other and covering the entire array of pixels. For example, the stacked layers may consist of a silicon carbide layer disposed atop a silicon nitride layer, which in turn is disposed atop a phosphosilicate glass layer. Techniques for fabricating such layers are well known in the art. The combined thickness for all three stacked layers is typically about 1.0 micron. The Upper Plate is separated from Lower Plate A and Lower Plate B by a suitable dielectric layer, such as silicon dioxide having a thickness of about 0.2 to 0.3 microns.

The transistor elements of the device, including transistors 16 and 26 and the transistors that comprise the charge integrator I, are formed at the upper surface of the substrate, and typically include polysilicon gate electrodes disposed within the composite dielectric body 32 just above the substrate 30. Because these conventional transistor elements are well known, their structures are not specifically illustrated but are schematically depicted by the circuit diagram superimposed on the cross-sectional face of the substrate 30. It should also be understood that the parasitic capacitances $C_{in}$ and $C_{out}$ arise from structures that exist in both the substrate 30 and in the composite dielectric body 32.

FIG. 2 also schematically depicts a portion of a user's finger 40 represented in a greatly enlarged scale. The finger 40 includes a variable skin contour 42 of a typical human fingerprint, which includes, in this enlarged partial view, a ridge 44 and a valley 46. The fingerprint ridge 44 is shown contacting the sensing surface 24, and the valley 46 provides a slight separation of the skin 42 at that point from the sensing surface 24.

The presence of a fingerprint ridge in contact with the sensing surface 24 above the Upper Plate increases the value of the sensing capacitor $C_s$. If a valley were present over the Upper Plate, capacitor $C_s$ would exhibit a lower value. As previously described in connection with FIG. 1, when a particular pixel is read, a pulse $\Delta V$ is generated by reference voltage source $V_r$. This pulse arrives at the pixel 10 as indicated by the arrow 48 in FIG. 2, and is applied to the pixel through the switch 16, which is closed when the pixel is read. The pulse $\Delta V$ propagates through capacitors $C_1$ and $C_2$ of the capacitive sensing stage and appears at the input 20 of the charge integrator stage. Prior to reading the pixel 10, switch 26 is opened. The charge integrator I generates the $V_{pixout}$ signal at its output node 14, where it propagates, as indicated by the arrow 50, to the output circuitry 18 (shown in FIG. 1).

The direct capacitive sensing technique provided by the structures of FIG. 2 produces a very fast pixel response time allowing an entire fingerprint image to be sensed very rapidly. The structure is very compact and has a high level of insensitivity to parasitic elements in the layout of the pixel 10. Also, the active charge integrator stage achieves a high gain that can be controlled by selecting the capacitance value of the feedback capacitor $C_{fb}$. These are some of the principle advantages of the invention.

Figure 3:
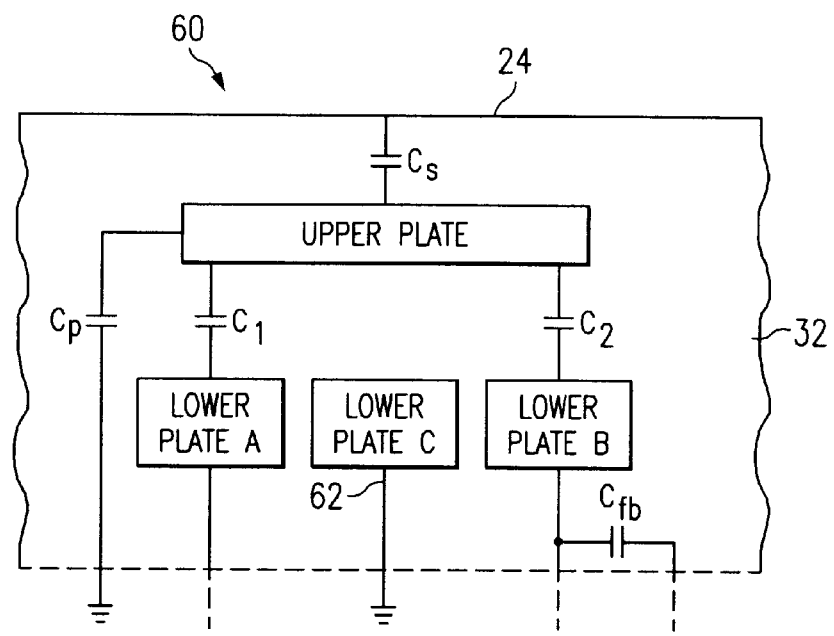
FIG. 3 is a schematic vertical cross-section of an upper portion of a semiconductor device similar to the upper portion of FIG. 2 and shows an alternative embodiment of the embedded capacitor plates of the invention.

Now referring to FIG. 3, an alternative embodiment of the embedded capacitor plates of the invention will be described. The pixel of this embodiment is designated by reference numeral 60 to distinguish it from the pixel 10 illustrated in FIG. 2. FIG. 3 also shows only the composite dielectric body 32, leaving out the substrate and circuit elements defined therein for convenience of illustration. It will be appreciated, however, that the transistors 16 and 26, charge integrator I, and capacitors $C_{in}$ and $C_{out}$ shown in FIG. 2 can be connected in the same manner shown therein to the Lower Plate A, Lower Plate B, and capacitor $C_{fb}$ of FIG. 3.

Comparing FIG. 3 to FIG. 2, one will recognize that the only modification is the inclusion of a Lower Plate C laterally disposed between and coplanar with Lower Plates A and B. Lower Plate C is connected by conductor 62 to ground. The effect of including Lower Plate C in the capacitive sensing stage is a reduction in the value of parasitic capacitor $C_p$ to a practical minimum value. As a trade off in comparison to the structure of FIG. 1, the structure of FIG. 3 may require slightly more chip area to implement as a practical matter. An additional advantage of the structure of FIG. 3 is a reduction in the edge coupling effect between Lower Plate A and Lower Plate B, which may slightly increase the sensitivity of the capacitive sensing stage.

Figure 4:
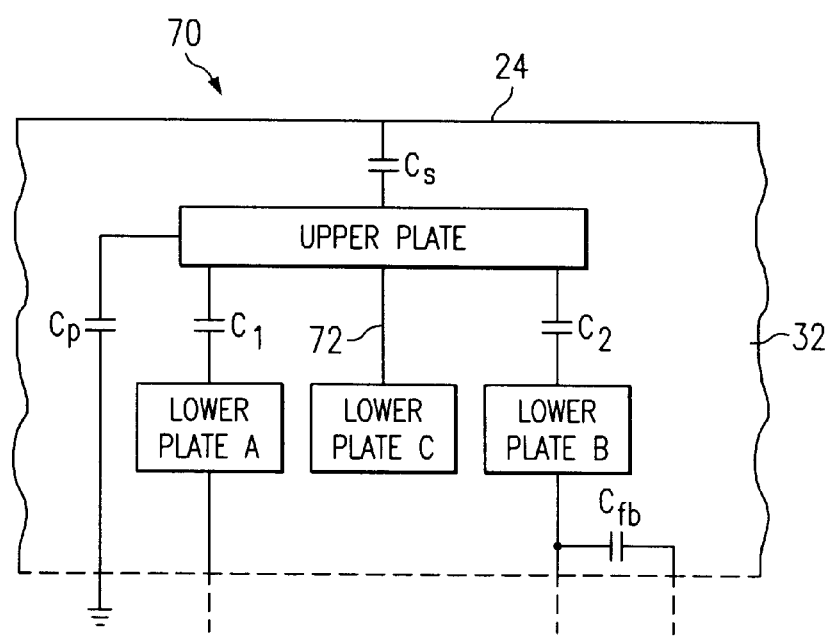
FIG. 4 is a schematic vertical cross-section similar to FIG. 3 showing another alternative embodiment of the invention.

Now referring to FIG. 4, another alternative embodiment of the embedded capacitor plates is shown, the pixel in this instance being designated by reference numeral 70. By comparing FIG. 4 to FIG. 3, one can see that the only difference is that Lower Plate C is connected by a conductor 72 to the Upper Plate, whereas Lower Plate C in FIG. 3 is connected to ground. Thus, Lower Plate C in FIG. 4 electrically floats with the upper plate. Conductor 72 may be formed as a conventional metal via between metal layers. This alternative embodiment also achieves a minimum capacitance value for parasitic capacitor $C_p$ and reduced edge coupling between Lower Plate A and Lower Plate B. Both the alternative embodiments of FIGS. 3 and 4 provide practical maximum values for capacitors $C_1$ and $C_2$.

Figure 5:
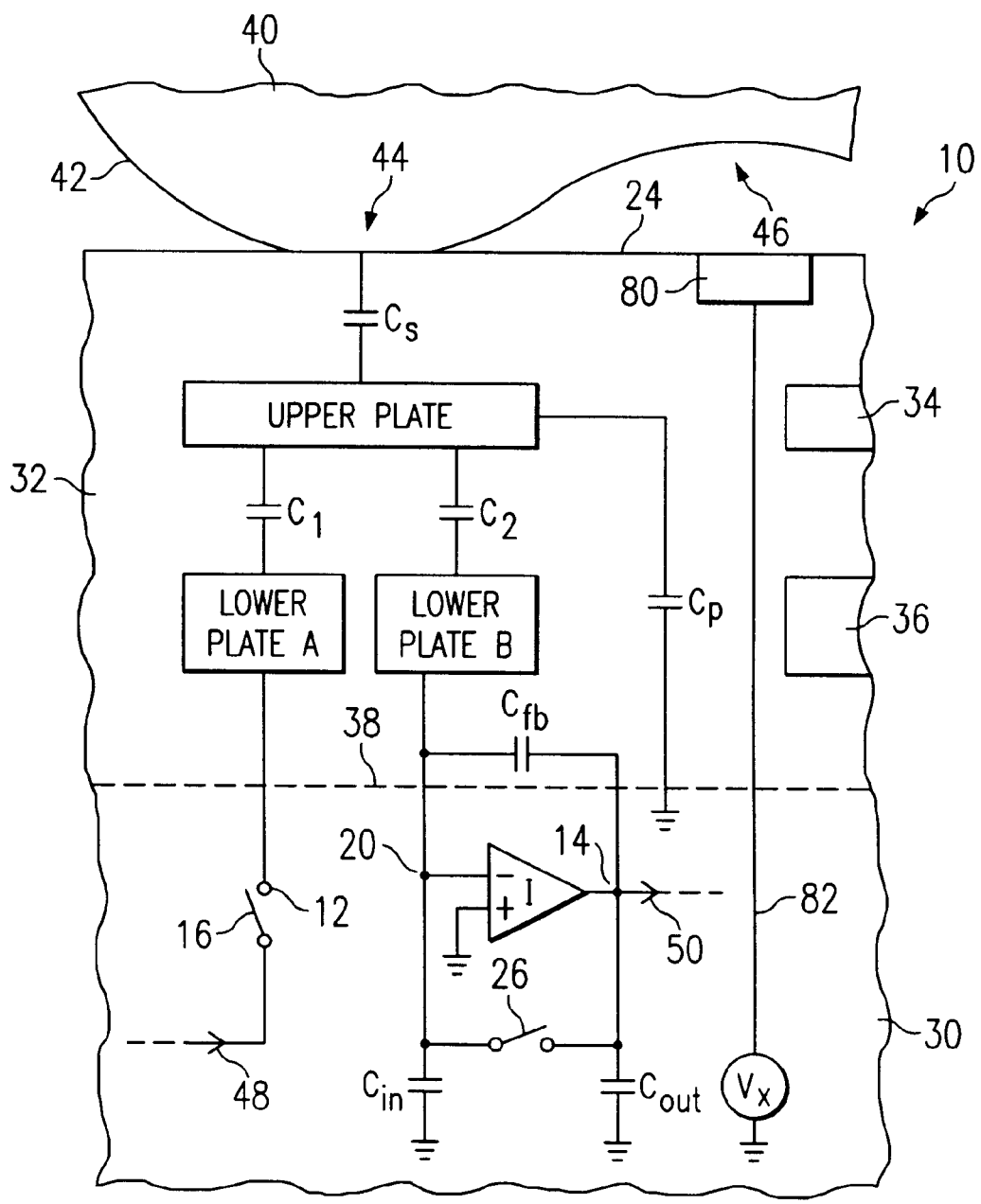
FIG. 5 is a schematic vertical cross-section similar to FIG. 2 showing an additional feature that can be employed with the various embodiments of the invention.

Now referring to FIG. 5, an additional feature that can be employed with any of the various pixels 10, 60 or 70 will be described. FIG. 5 uses the pixel 10 of FIG. 2 by way of example. In FIG. 5, a contact 80 is disposed at the top surface 24. The contact 80 may be one of many similar contacts located at various points within the pixel array, or may represent lines or a grid running through the array. In the particular layout selected, the contact 80 enables direct contact with the skin 42 of the finger, which can be electrically driven by a pulse signal $\Delta V_x$ that is applied in synchronization, but not necessarily in phase, with each read operation pulse $\Delta V$ previously described. FIG. 5 shows pulse source $V_x$ with its output connected by conductor 82 to the surface contact 80 for applying the $\Delta V_x$ pulse. By comparison to the structure of FIG. 2, the structure of FIG. 5, with the ability to drive the skin of the finger with a synchronized pulse $\Delta V_x$, approximately doubles the $V_{pixout}$ output swing of the charge integrator I. Although this technique may improve the sensitivity of the fingerprint sensor and thus provide a more accurate fingerprint image, it also adds complexity to the structure, which must be taken into consideration by the device designer.

It will be appreciated that the various capacitor plates can be laid out in different patterns. In its simplest form shown in FIG. 2, for example, the Upper Plate may be square and Lower Plates A and B maybe rectangles with their long edges facing each other across the narrow gap separating them, their outer edges generally conforming to the square shape of the Upper Plate. Such a layout is effective to minimize the value of parasitic capacitor $C_p$ since Lower Plates A and B shield the Upper Plate to a significant extent from ground. Many other layouts are possible for implementing the invention.

Although preferred and alternate embodiments have been described in detail, it should be understood that various additional changes, substitutions and alterations can be made without departing from the spirit and scope of the invention as defined by the appended claims.

What is claimed is:

1. A pixel for a fingerprint sensing device formed atop a semiconductor substrate and including a sensing surface for contact by the skin of a user's finger, the pixel comprising:
    a pixel input node for receiving an input signal;
    a pixel output node for generating an output signal;
    a capacitive sensing stage connected to the pixel input node, the capacitive sensing stage including an upper plate disposed proximate to and just beneath the sensing surface, and including first and second lower plates disposed proximate to and just beneath the upper plate, the first lower plate being connected to the pixel input node, the upper plate defining a sensing capacitor with the sensing surface and a portion of the skin of the user's finger in contact with or just above the sensing surface during a sensing operation, the upper plate further defining a first capacitor with the first lower plate, a second capacitor with the second lower plate, and a parasitic capacitor with a ground node; and
    a charge integrator stage including a charge integrator and a feedback capacitor, the charge integrator having an input node and having an output node corresponding to the pixel output node, the feedback capacitor coupling the charge integrator's input and output nodes, the charge integrator's input node being connected to the second lower plate;
    whereby the charge integrator generates an output signal that is a function of the capacitance of the sensing capacitor, which varies according to the presence of a fingerprint ridge or valley in contact with or just above the sensing surface during a sensing operation.

2. The pixel of claim 1 further comprising a reset transistor connected across the input and output of the charge integrator, whereby the reset transistor is turned on and then off prior to each sensing operation to prepare the charge integrator to generate an accurate output signal during each sensing operation.

3. The pixel of claim 1 wherein the first lower plate and second lower plate are arranged side-by-side with adjacent edges defining a narrow gap therebetween, the first and second lower plates having outer edges that together substantially conform to the shape of the layout of the upper plate, whereby the value of the parasitic capacitor is minimized.

4. The pixel of claim 1 further comprising a third lower plate laterally disposed between the first and second plates, the third lower plate being connected to the ground node.

5. The pixel of claim 4 wherein the upper plate consists essentially of aluminum, and wherein the sensing surface is formed by a thin dielectric layer lying atop the upper plate.

6. The pixel of claim 1 further comprising a third lower plate laterally deposed between the first and second lower plates, the third lower plate being connected to the upper plate.

7. The pixel of claim 6 wherein the upper plate consists essentially of aluminum, and wherein the sensing surface is formed by a thin dielectric layer lying atop the upper plate.

8. A fingerprint sensing device, comprising:
    a semiconductor substrate;
    a composite dielectric body disposed atop the substrate and having an upper surface defining a flat sensing surface for contact by the fingerprint-bearing skin of a user's finger;
    a reference voltage source formed at least in part in the substrate for generating an input signal; and
    a plurality of pixels, each pixel including:
        an upper plate disposed within the composite dielectric body beneath and parallel to the sensing surface;
        first and second lower plates disposed beneath and lying parallel to the upper plate;
        a transistor connected to the first lower plate for selectively applying the input signal to the first lower plate;
        means formed at least in part in the substrate connected to the second lower plate for generating an amplified output signal in response to application of the input signal to the first lower plate, the output signal being a function of the capacitances defined by the first lower plate and the upper plate, by the upper plate and the sensing surface and any fingerprint portion in contact therewith, and by the upper plate and the second lower plate; and
        a feedback capacitor connected between an output node of the output-signal generating means and the second lower plate, wherein the output signal is inversely proportional to the capacitance of the feedback capacitor multiplied by an arithmetic sum of capacitance values that includes the capacitance between the upper plate and the sensing surface contacted by a finger during a sensing operation.

9. A fingerprint sensing device, comprising:
    a semiconductor substrate;
    a composite dielectric body disposed atop the substrate and having an upper surface defining a flat sensing surface for contact by the fingerprint-bearing skin of a user's finger;
    a reference voltage source formed at least in part in the substrate for generating an input signal; and
    a plurality of pixels, each pixel including:

an upper plate disposed within the composite dielectric body beneath and parallel to the sensing surface;

first and second lower plates disposed beneath and lying parallel to the upper plate;

a transistor connected to the first lower plate for selectively applying the input signal to the first lower plate; and means formed at least in part in the substrate connected to the second lower plate for generating an amplified output signal in response to application of the input signal to the first lower plate, the output signal being a function of the capacitances defined by the first lower plate and the upper plate, by the upper plate and the sensing surface and any fingerprint portion in contact therewith, and by the upper plate and the second lower plate;

wherein the output-signal generating means comprises:
- a charge integrator having an input node and an output node, the output node providing the output signal, the input node being connected to the second lower plate;
- a feedback capacitor connected between the charge integrator's input and output nodes; and
- a reset transistor switch connected between the charge integrator's input and output nodes for preparing the charge integrator for a sensing operation.

10. The fingerprint sensing device of claim 9 further comprising output circuitry connected to the output node of the charge integrator for creating a digitized value of the output signal.

11. The fingerprint sensing device of claim 9 wherein the upper plate, first lower plate and second lower plate consist essentially of aluminum.

12. The fingerprint sensing device of claim 9 wherein the upper plate comprises metal, and the first and second lower plates comprise conductive polysilicon.

13. The fingerprint sensing device of claim 9 wherein the output signal is inversely proportional to the capacitance of the feedback capacitor multiplied by an arithmetic sum of capacitance values that includes the capacitance between the upper plate and the sensing surface contacted by a finger during a sensing operation.

14. The fingerprint sensing device of claim 9 further comprising a surface contact disposed atop the composite dielectric body and arranged to contact the skin of a user's finger during a fingerprint sensing operation; and
- a pulse source for applying a pulse signal to the surface contact in synchronization with the application of the input signal to the pixel.

15. A fingerprint sensing device having a plurality of pixels formed within semiconductor and dielectric material, the dielectric material disposed atop the semiconductor material and having a top surface defining a sensing surface for contact with a human finger to capacitively sense a fingerprint, each pixel comprising:

an upper plate disposed within the dielectric material beneath and proximate to the sensing surface, the upper plate remaining in an electrically floating state;

first and second lower plates disposed beneath and lying parallel to the upper plate;

means for selectively applying an input pulse to the first lower plate; and a charge integrator connected to the second lower plate for generating a pixel output signal;

wherein a sensing capacitor having a variable capacitance is formed by the upper plate and the user's finger applied to the sensing surface, and first and second capacitors are formed between the upper plate and the respective first and second lower plates, and wherein the output signal generated by the charge integrator varies with the capacitance value of the sensing capacitor to indicate the proximity of the skin of the user's finger to the sensing surface when the input pulse is applied to the lower plate.

16. The fingerprint sensing device of claim 15 further comprising a feedback capacitor connected across the charge integrator, the capacitance value of the feedback capacitor being selected to tune the gain of the charge integrator.

17. The fingerprint sensing device of claim 16 further comprising a third lower plate lying between and coplanar with the first and second plates, the third lower plate being connected to ground.

18. The fingerprint sensing device of claim 16 further comprising a third lower plate lying between and coplanar with the first and second lower plates, wherein the third lower plate is connected to the upper plate and electrically floats with the upper plate.

19. The fingerprint sensing device of claim 15 wherein the pulse-applying means consists of an NMOS transistor.

20. The fingerprint sensing device of claim 15 further comprising means for electrically driving the skin of the finger in contact with the sensing surface with a pulse synchronized to the selective application of the input pulse to the lower plate of each pixel in a sequence of individual pixel sensing operations.

21. A fingerprint sensing device, comprising:

a semiconductor substrate;

a composite dielectric body disposed atop the substrate and having an upper surface defining a flat sensing surface for contact by the fingerprint-bearing skin of a user's finger;

a reference voltage source formed at least in part in the substrate for generating an input signal; and a plurality of pixels, each pixel including:
- an upper plate disposed within the composite dielectric body beneath and parallel to the sensing surface;
- first and second lower plates disposed beneath and lying parallel to the upper plate;
- a transistor connected to the first lower plate for selectively applying the input signal to the first lower plate; and
- means formed at least in part in the substrate connected to the second lower plate for generating an amplified output signal in response to application of the input signal to the first lower plate, the output signal being a function of the capacitances defined by the first lower plate and the upper plate, by the upper plate and the sensing surface and any fingerprint portion in contact therewith, and by the upper plate and the second lower plate;

the fingerprint sensing device further comprising:
- a surface contact disposed atop the composite dielectric body and arranged to contact the skin of a user's finger during a fingerprint sensing operation; and
- a pulse source for applying a pulse signal to the surface contact in synchronization with the application of the input signal to the pixel.

* * * * *